US010693641B2

(12) United States Patent
Adams et al.

(10) Patent No.: US 10,693,641 B2
(45) Date of Patent: Jun. 23, 2020

(54) SECURE CONTAINER BASED PROTECTION OF PASSWORD ACCESSIBLE MASTER ENCRYPTION KEYS

(71) Applicant: BlackBerry Limited, Waterloo (CA)

(72) Inventors: Neil Patrick Adams, Waterloo (CA); Catalin Visinescu, Kitchener (CA)

(73) Assignee: BlackBerry Limited, Waterloo Ontario (CA)

(*) Notice: Subject to any disclaimer, the term of this patent is extended or adjusted under 35 U.S.C. 154(b) by 262 days.

(21) Appl. No.: 15/869,133

(22) Filed: Jan. 12, 2018

(65) Prior Publication Data
US 2019/0222419 A1 Jul. 18, 2019

(51) Int. Cl.
H04L 9/08 (2006.01)
H04L 9/32 (2006.01)
G06F 21/45 (2013.01)
G06F 21/62 (2013.01)
G06F 7/58 (2006.01)

(52) U.S. Cl.
CPC ............ *H04L 9/0894* (2013.01); *G06F 21/45* (2013.01); *G06F 21/6209* (2013.01); *H04L 9/0869* (2013.01); *H04L 9/3226* (2013.01); *H04L 9/3231* (2013.01); *G06F 7/588* (2013.01); *G06F 2221/2131* (2013.01); *H04L 2209/08* (2013.01)

(58) Field of Classification Search
CPC ... H04L 9/0894; H04L 9/0869; H04L 9/3231; H04L 9/3226; H04L 2209/08; G06F 21/6209; G06F 21/45; G06F 2221/2131; G06F 7/588
See application file for complete search history.

(56) References Cited

U.S. PATENT DOCUMENTS

| 7,043,636 | B2 * | 5/2006 | Smeets | G06F 12/1408 711/E12.092 |
| 8,572,757 | B1 | 10/2013 | Stamos et al. | |
| 9,634,999 | B1 | 4/2017 | Marion et al. | |
| 10,291,567 | B2 * | 5/2019 | Gallant | H04L 51/22 |
| 2003/0177401 | A1 | 9/2003 | Arnold et al. | |
| 2011/0191533 | A1 * | 8/2011 | Coulter | G06Q 10/00 711/112 |
| 2014/0140508 | A1 | 5/2014 | Kamath et al. | |

(Continued)

OTHER PUBLICATIONS

Extended European Search Report issued for European Application No. 18213808.1 dated May 16, 2019.

(Continued)

Primary Examiner — Michael R Vaughan
(74) Attorney, Agent, or Firm — Jeffrey N. Giunta; Fleit Intellectual Property Law

(57) ABSTRACT

Systems and methods for maintaining encryption keys are disclosed. An encrypted master key is determined by encrypting a master key based on an initial user password and discarding the master key. The encrypted master key is stored. A request for the master key including a present user password is received and verified based on comparison to the initial user password. Based on failure of verifying the present user password, a failed attempt counter that is maintained within a secure container is created. User password based access to the master key is locked out based on the failed attempt counter exceeding a defined value.

20 Claims, 9 Drawing Sheets

(56) References Cited

U.S. PATENT DOCUMENTS

2016/0026810 A1    1/2016  Hagiwara et al.

OTHER PUBLICATIONS

Vishalakshi.R et al., "Trusted Execution Environment—To Harden Every Day Android Applications on Intel Architecture," International Journal of Advanced Research in Electrical, Electronics and Instrumentation Engineering. vol. 4, Issue 5, May 2015, 7 Pages.
Zhao, S., et al., "Providing Root of Trust for ARM TrustZone using On-Chip SRAM," TrustED '14 Prooceedings of the 4th International Workshop on Trustworthy Embedded Devices, pp. 25-36, Nov. 2014.
Webinar, "How to implement a secure IoT system on ARMv8-M," downloaded from https://web.archive.org/web/20171013111042/https://developer.arm.com/technologies/trustzone, downloaded on Jan. 10, 2018.

* cited by examiner

US 10,693,641 B2

SECURE CONTAINER BASED PROTECTION OF PASSWORD ACCESSIBLE MASTER ENCRYPTION KEYS

FIELD OF THE DISCLOSURE

The present disclosure generally relates to encryption key storage, and more particularly to protecting encryption keys in secure containers while supporting access to keys by using user passwords.

BACKGROUND

Access to various data or functions via electronic devices is able to be limited by having a user enter a password or other credentials prior to granting access. Various programs exist to manage the multiple passwords or other credentials used to access the many functions, accounts, other elements, or combinations of these. In an example, a program known as a Password Keeper, such as is available from BlackBerry Limited, allows a user to securely store multiple passwords or other credentials in association with accounts or other functions. These passwords or other credentials in an example are stored in a database structure that is encrypted with a master key. In various examples, the master key is protected and access by the Password Keeper to that master key requires a user to enter a user password.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
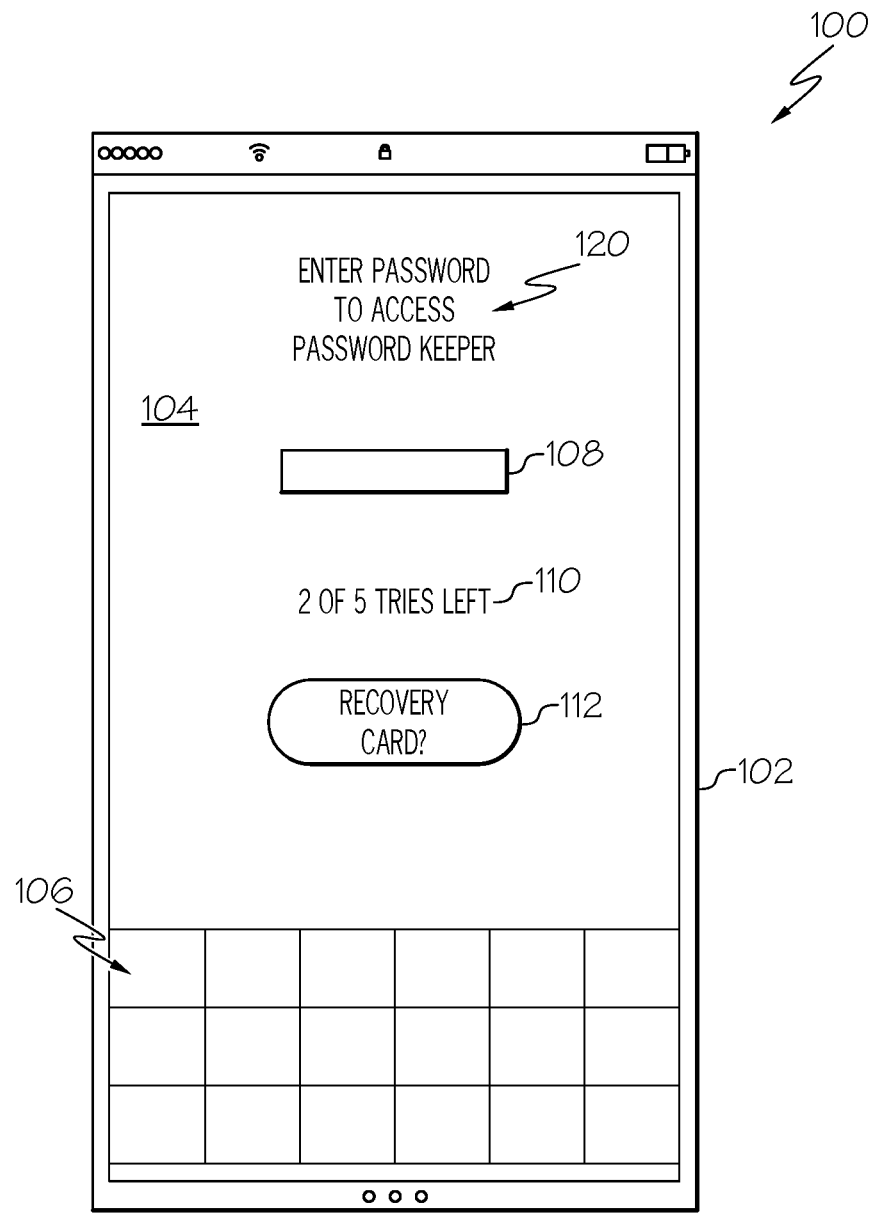
FIG. 1 illustrates an electronic device user interface view, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to securely protect a master encryption key, herein referred to as a master key, while allowing a user to retrieve that master key by entering a user password. In general, the user password provides less robust protection than the master key. In many instances, an attacker with a device is likely to more easily access data encrypted with the master key through brute force attempts to find the user password rather than trying to perform a brute force attack to find the master key by repeatedly attempting to decrypt data encrypted by that master encryption key.

The following discussion describes storing data, performing functions, or both, in conjunction with a secure container. In the following discussion, a secure container is to be understood as any processing structure, data structure, or both, that provides restricted access to data, processing, or both. Examples of secure containers include, but are not limited to, a trusted execution environment (TEE), a Hardware Security Module (HSM), a Trusted Platform Module (TPM), Arm® TrustZone® technology, or combinations of any of these.

The below described systems and methods operate to limit the number of failed attempts that can be made in trying to access a master key by use of a user password. In an example, a failed attempt counter is maintained in a secure container. In an example, the processing in the secure container locks out access to the master key through use of the user password when the failed attempt counter is incremented above a defined threshold value. As such, the user is not able to access the master key by using a password once access is locked out, even if the correct user password is provided after the lockout. This processing structure limits an attacker's attempts to access the master key on a device with a weak password, such as a password that consists of a 4 digit PIN that can be relatively easily obtained by brute-force, because the attacker only has a few attempts to guess the user password. After the attacker reaches the maximum number of attempts, the attacker cannot continue to brute force the user password. After reaching the maximum number of attempts, the attacker can only brute-force the master key. Because the failed attempt counter is stored in a secure container, and processing to increment or otherwise maintain the failed attempt counter is also restricted to the secure container, an attacker is not able to modify or reset the failed attempt counter.

In an example, that secure container also controls access to the master encryption key and performs processing to validate user passwords that are received with user requests to access or otherwise manage the master key. Restricting the processing of password validation and maintaining the failed attempt counter to processing within a secure container restricts the ability of an attacker to circumvent the limitation on failed user password attempts.

In an example, a user is able to create a recovery key, which is also referred to as a "recovery card" in the following description, to recover the master key once access with the user password has been locked out. In an example, an originating device creates the recovery key and provides the recovery key to a separate device. In an example, a user of the separate device stores the recovery key in a Password Keeper program on that separate device, and that user is able to send that recovery key back to the originating device to allow the master key to be recovered on that originating device.

In an example, a master key is generated by a hardware random number generation within a secure container that is designed to generate random numbers to support cryptographic operations such as key generation. This master key is encrypted in an example with a master encryption key that is produced by a hash function of a value that is a combination of a user password, a salt value, and a diversifier value. In the present discussion, an example of a diversifier value is a hard coded unique value that is assigned to each device. The diversifier value improves protection against trying to decrypt data on a device that is different from the device that encrypted the data, since that diversifier value used for encryption is not available to that different device. In an example, the hardware random number generator also generates a salt value that is used for master key protection operations. The salt value in an example is stored in the secure container and is not available to the general operating system.

In some examples, each iteration of functions to access, maintain, or perform other operations associated with maintaining the master key, execute all instructions in the function in order to protect against timing side-channel attacks. For example, all key generation, hash functions, encryption/decryption, other processing, or combinations of these, are performed prior to returning success or error messages, such as failure to validate a provided user password. Performing these operations in a secure container in an example further protects these operations from side-channel attacks.

The following discussion refers to providing access to data or operations based on user authentication information that is a user password. It is to be understood that the below described systems and methods are able to be used in conjunction with any suitable type of user provided authentication information, such as alpha-numeric passwords, selection of buttons on a display or other input device, tracing patterns on a touch sensitive surface, any other authentication inputs, or combinations of any of these.

In some examples, user authentication is able to be based at least in part on validation of biometric information. In some examples, user authentication is able to be based on any suitable biometric data, such as a person's iris scan, retina scan, facial recognition, voice recognition, other biometric data, or any combination of any of these. In some examples, other user authentication methods are able to be used including, for example, gesture input on a touch screen, gestures captured as videos or as other suitable inputs, by other authentication techniques, or by any combination of any of these.

In an example, validation of a user's fingerprint may be used to control access to a master key. Validation of a user's fingerprint in some examples includes a user configuring a device with a reference fingerprint scan, which is similar to initializing a user's password. The device stores the reference fingerprint scan data and compares subsequently received fingerprint scan data to that reference fingerprint scan to validate the user. In some examples, the processing to receive and store the reference fingerprint scan data and the processing to subsequently validate subsequently received fingerprint scan data against the reference fingerprint scan data is performed in a secure container. The reference fingerprint scan is also stored in the secure container in some examples.

In one example, access to the master key is conditioned upon both the user's presenting a valid fingerprint scan and a user's password. In an example, a user is able to enter a user password and the user password is encrypted with a password key and stored. The password key in this example is stored in the secure container. The secure container only releases the password key when a valid fingerprint scan is received. The password key, after it is released based on receipt of a valid fingerprint scan, is used to decrypt the encrypted password to obtain the cleartext password. That cleartext password is then processed in an example as though the user had entered that password.

In general, the systems and methods described below are applicable to any type of device. In various examples, these systems and methods are applicable to any type of electronic device that is able to be used in any type of operational environment. In some examples, these systems and methods are able to be included in desktop systems, physically installed systems, other systems that are not intended to be frequently moved, or in combinations of these. In further examples, these systems and methods can be incorporated into one or more of portable electronic devices, which include devices that are easily carried by a person or other carrier; or mobile devices including smartphones, tablets, phablets, wearable devices, and include devices mounted in movable systems such as vehicles of any type. In various examples, these electronic devices are able to be located in vehicles that include, but are not limited to, motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. These electronic devices are also able to include fixed devices, which include devices that are not designed to be easily or often relocated such as desktop electronic equipment; other types of electronic equipment, or combinations of these. Other examples of devices include an endpoint device, IoT (Internet of Things) device, EoT (Enterprise of Things) device, etc.

FIG. 1 illustrates an electronic device user interface view 100, according to an example. The electronic device user interface view 100 depicts an example electronic device 102 that includes a password keeper program to securely maintain and provide controlled access to various user passwords used for various operations on the electric device 102.

The electronic device 102 includes a display 104 to present visual data, such as images, text, other visual data, or combinations of any of these, to a user of the electronic device. In some examples, the display 104 comprises a touch sensitive display that is able to receive inputs from a user based on a user's touching the display at certain locations, such as locations at which particular icons or other information is presented on the display. In examples in which the display 104 comprises a touch sensitive display, a user is able to touch, swipe, perform various gestures, or utilize other techniques recognized by the touch sensitive display 104 to provide various inputs.

The electronic device in some examples comprises a keyboard 106. Keyboard 106 in various examples is able to be any suitable device to receive input from a user. In some examples, keyboard 106 is a virtual keyboard that is displayed on a portion of a touch sensitive display 104 and is able to receive alphanumeric inputs, characters, symbols, emoji, or other similar input from a user based on a user touching the touch sensitive display 104 at a location corresponding to a displayed alphanumeric character. In some examples, keyboard 106 is able to comprise a physical keyboard with buttons or keys corresponding to one or more alphanumeric characters that are able to receive an input of a particular character by a user touching or pressing a button or key associated with that character. In further examples, other user input facilities are able to be included in, in communications with, or otherwise interfacing with, the electronic device 102 to allow a user to provide alphanumeric input.

The depicted display 104 is shown to include a user prompt 120. The user prompt 120 in this example specifies "ENTER PASSWORD TO ACCESS PASSWORD KEEPER." The user prompt 120 is displayed in conjunction with a text entry box 108. The text entry box 108 in an example allows a user to enter text, such as via the keyboard 106, for use by processing within the electronic device 102. The combination of user prompt 120 and text entry box 108 indicates to the user that the user is able to enter a user password into the text entry box, such as by using the keyboard 106, in order to "unlock" the database of the password keeper operating on the electronic device 102. Once unlocked, the password keeper in an example provides one or more stored passwords to various applications, remote servers, other services or operations, or combinations of any of these, as required.

The depicted display 104 further includes a "RECOVERY CARD" icon 112 or other user interface element. In an example, a user is able to select the "RECOVERY CARD" icon 112 in order to unlock the password keeper on the electronic device 102 through use of a recovery card. In an example, a recovery card is a data set, such as a particular cryptographic key, that is given to a third party for storage and that can then be used with the electronic device 102 to unlock the password keeper database. Unlocking the database of the password keeper operating on the electronic device 102 by use of a recovery card is described in further detail below.

Figure 2:
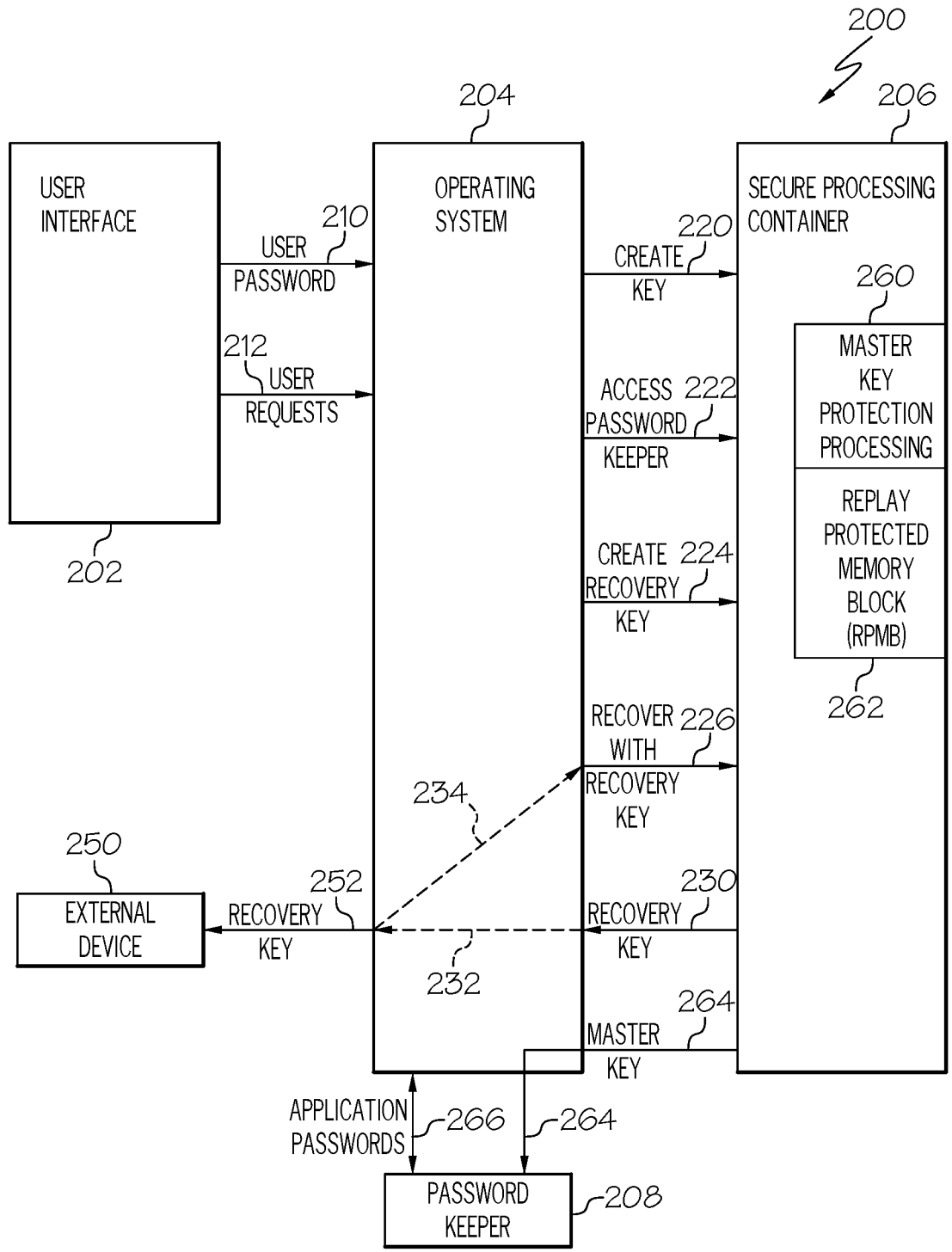
FIG. 2 illustrates an electronic device processing component block diagram, according to an example.

FIG. 2 illustrates an electronic device processing component block diagram 200, according to an example. The electronic device processing component block diagram 200 includes processing components that are able to be resident in one or more hardware elements of an electronic device, such as the above described electronic device 102. In an example, at least some of the depicted processing elements are able to be implemented with one or more computer processors.

The electronic device processing component block diagram 200 includes a user interface 202. In an example, the user interface 202 includes the above described touch sensitive display 104 and keyboard 106. In further examples, the user interface 202 is able to include any suitable components, such as one or more of voice or other audio input/output facilities, other facilities for one or both of receiving user inputs and providing user outputs, or any combination of these.

The electronic device processing component block diagram 200 includes an operating system 204 that performs various operations implemented by an associated electronic device. In order to more clearly and simply describe the below described examples, the following description discusses the functions and operations performed by the operating system 204 that are related to operations associated with controlling access to encryption keys. It is to be understood that in some examples, the operating system 204 is able to perform one or more other functions to support operation of an electronic device.

As described in further detail below, the operating system receives information from the user interface 202. In an example, a user password 210 is received by the operating system 204 from the user interface 202. In one such example, the user password is used to unlock access to protected encryption keys as is described in further detail below, such as by unlocking the database used by a password keeper. The user interface 202 further provides user requests 212 to the operating system 204. Examples of such user requests provided to the operating system from the user interface 202 include commands to manage master key protection processing as are described in further detail below.

The electronic device processing component block diagram 200 includes a password keeper processing component 208. The password keeper processing component 208 in an example receives, stores, and protects various passwords 266 that are used by various applications operating within the operating system 204 to access various services, applications, other processes, or combinations of any of these. The password keeper processing component 208 in an example receives and securely stores user passwords, other data, or both, within the application passwords 266 that are received from the operating system 204 or any other suitable source. For example, a user is able to enter passwords, Personal Identification Numbers (PINs), other data, or combinations of any of these, that are used to access various protected processes or resources. In some examples, passwords or other data stored and protected by the password keeper processing component 208 are used to access remote servers or other services available via data communications, such as the Internet. As is described in further detail below, the password keeper processing component 208 provides passwords or other data requested by the operating system 204 in response to a user provided password. Data stored and maintained in the password keeper processing component 208 in an example is encrypted with a master key that is stored and provided by secure processing, as is described in further detail below.

The electronic device processing component block diagram 200 includes a secure processing container 206. The secure processing container 206 is an example of a secure container that performs at least some processing associated with an encryption key protection processor. The secure processing container 206, in an example, includes a suitable implementation of a secure container that provides a separate, protected data processing and storage environment that is not directly accessible by processing outside of the secure processing container 206. Examples of implementations of a secure processing container 206 include the Trusted Platform Module (TPM), defined by the Trusted computing group (TCG), and the Arm® TrustZone® technology, provided by Arm Limited.

The secure processing container 206 in an example includes a master key protection processing component 260. The master key protection processing component 260 in an example implements the below described processes to create, protect, provide restricted access to, otherwise maintain, perform other functions with, or combinations of any of these with, master keys for encryption processes. In an example, the master key protection processing component 260 protects and otherwise performs processing associated with one or more master keys for the password keeper processing component 208. The master key protection processing component 260 uses a replay protected memory block (RPMB) 262 to securely store data used in its operation. The data stored in the replay protected memory block 262 is essentially not directly accessible by, or modifiable by, processing performed outside the secure processing container 206. The replay protected memory block (RPMB) 262 is an example of protected storage that is within the secure processing container 206. In an example, such protected storage is memory that is protected in conjunction with processing of the secure processing container 206.

The electronic device processing component block diagram 200 depicts a number of data items or commands that are exchanged between the operating system 204 and the secure processing container 206. Data, commands, or both, are able to be exchanged by special interfaces that are provided between the general operating system 204 of an electronic device and the secure processing container 206.

The operating system 204 in the illustrated example provides commands to the secure processing container 206 in order to control operations performed by the secure processing container 206. Commands provided by the operating system 204 to the secure processing container 206 in the illustrated example include a create key command 220, an access password keeper command 222, a create recovery key command 224, and a recover with recovery key command 226. In the illustrated example, the recover with recovery key command 226 also includes a data item containing the recovery key data that is sent with that command.

A data item created within the secure processing container 206 in the illustrated example and that is provided to the operating system 204 is the master key 264. In this example, the operating system 204 provides the master key 264 data item to the password keeper processing component 208. In various example, any suitable interface or interfaces are able to be used by the operating system 204 to receive the master key 264 data item from the secure processing container 206 and provide the received master key 264 data item to the password keeper processing component 208.

Another data item provided by the secure processing container 206 to the operating system 204 in the illustrated example also provides to the operating system 204 is the recovery key 230 data item. In an example, the recovery key data item 230 is provided by the secure processing container 206 in response to receiving a create recovery key command 224. The secure processing container 206 is able to provide the recovery key 230 data item to the operating system 204 by any suitable interface.

The operating system in the illustrated example includes an operating system recovery key transmission process 232 to convey a recovery key 230 received from the secure processing container 206 to an external device connection 252. In an example, the external device connection 252 provides bidirectional data communications with an external device 250. The external device connection 252 is able to include any suitable communications path between an electronic device hosting the operating system 204 and the external device 250. Examples of an external device connection 252 are able to include any one or more of a wired connection, a wireless connection, optical communications, other communications, or any combination of any of these. In an example, the external device is another electronic device that includes a password keeper processing component 208 that stores and maintains the recovery key for this device. In an example the password keeper processing components 208 in each device coordinate transfer of the recovery key 230 via a suitable interface, such as a Near Field Communications (NFC) link.

In an example, processing by the secure processing container 206 to send a recovery key 230 to the external device 250 includes establishing a secure communications channel with the external device 250. In an example, the secure communications channel is able to provide secure communications between at least the operating system 204 and suitable processing on the external device to receive, process, and return data such as the recovery key 230.

In some examples, a recovery key 230 is provided to the external device 250 along with a user identifier. The user identifier is able to be any suitable identifier that for a user that is associated with one or more of the external device, the device containing the operating system 204, or both. In some examples, the master key protection processing component 260 processes different recovery keys for different user identifiers. In such an example, requests to recover the master key with a recovery key are provided along with the user identifier associated with that recovery key, which is also the user identifier provided to the external device when that recovery key is sent.

In an example, the external device 250 is able to return to an originating electronic device the recovery key 230 data item that had been received from that originating electronic device. As shown in the electronic device processing component block diagram 200, a recovery key 230 sent from the external device 250 to the operating system 204 via the external device connection 252 is communicated to the secure processing container 206 via a recovery key reception process 234 within the operating system 204. In an example, the process of sending the recovery key 230 received from an external device to the secure container is performed based on or in response to the user, via the user interface 202, initiating a recovery operation, such as by selecting the recovery card icon 112 described above. In some examples, the operating system 204 sends a recovery key request to the external device 250 for the recovery key. In some examples, the recovery key request also includes the user identifier that was previously sent with the recovery key.

Figure 3:
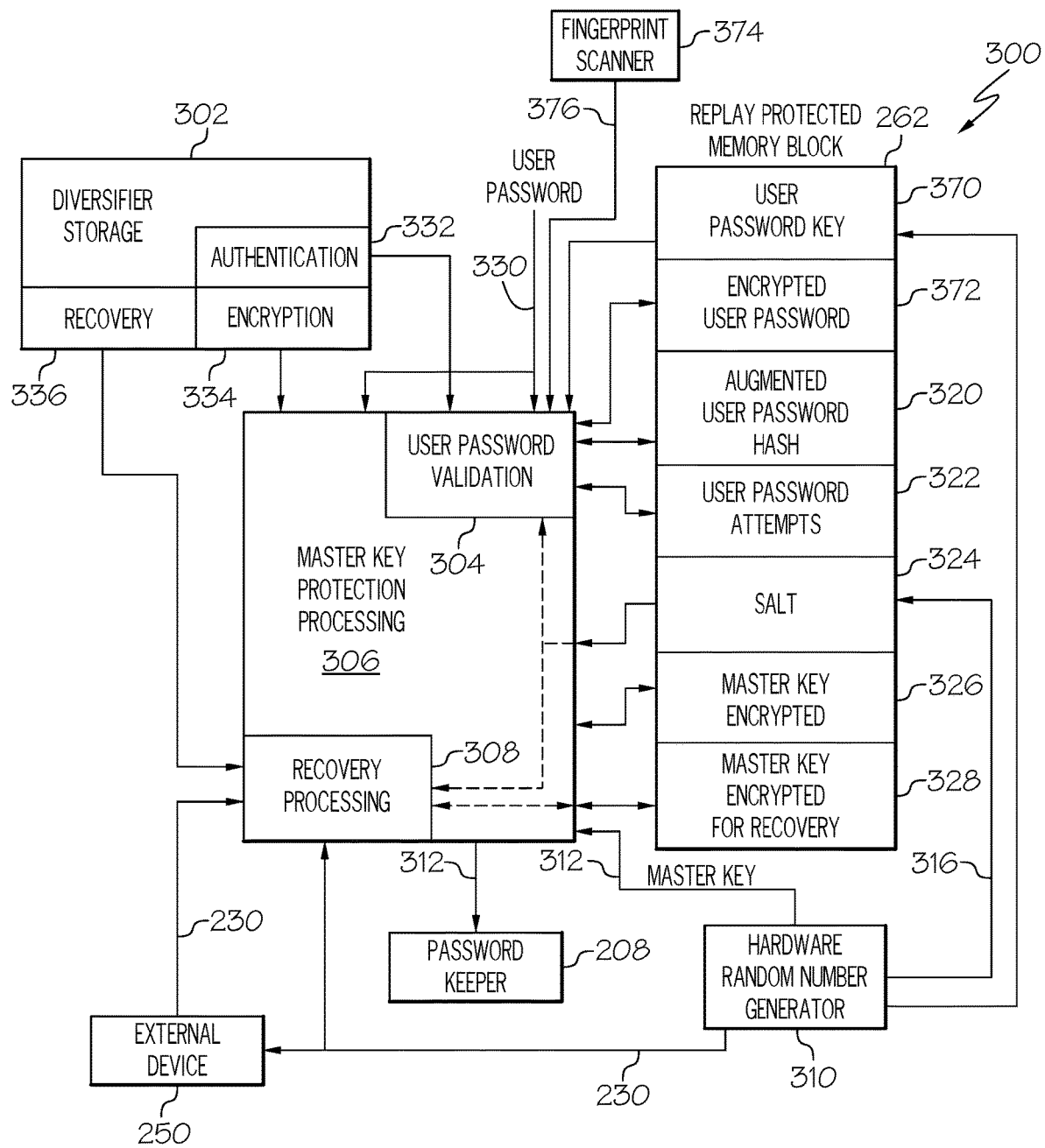
FIG. 3 illustrates a master key protection processing flow diagram, according to an example.

FIG. 3 illustrates a master key protection data flow/block diagram 300, according to an example. The master key protection data flow/block diagram 300 depicts an example of processing performed by the master key protection processing component 260 described above. In some examples, many aspects of the master key protection data flow/block diagram 300 are performed by processing within a secure container, as is discussed above.

The master key protection data flow/block diagram 300 includes a master key protection processing component 306. The master key protection processing component 306 performs much of the processing that is described in further detail below. The master key protection processing component 306 in an example is similar to the master key protection processing component 260 and is performed in a secure container, such as is described above. As is described in further detail below, the master key protection processing component 306 stores data in protected storage, such as the above described Replay Protected Memory Block (RPMB) 262 to support its processing.

The master key protection data flow/block diagram 300 includes a diversifier storage 302. The diversifier storage 302 in an example stores values that are combined with other values to obtain values that are a basis for various encryption key values or authentication hash values. In an example, the diversifier storage 302 stores some different values that are combined with other values and processed via a cryptographic hash function to obtain encryption keys for various purposes, as are described below. Further, some data stored in the diversifier storage is able to be added to, for example, user passwords along with other data to create a hash value used for later authentication based on that user's password. The diversifier storage 302 in this example stores an authentication diversifier value 332, an encryption diversifier value 334 and a recovery diversifier value. Adding diversifier values to other data in this manner adds security to the master key protection processing component 306, as is described below. In an example, each of these diversifiers is a different value that is a hard-coded string that is unique to each device that performs master key protection processing component 306.

The master key protection data flow/block diagram 300 includes a hardware random number generator 310 (RNG). The hardware random number generator 310 is used to generate random numbers that are used, in conjunction with other values, as a basis for cryptographic keys used to encrypt data or as salts to improve the effectiveness of various hash functions. The hardware random number generator 310 creates a salt value 316 that is stored in a salt storage 324 within the replay protected memory block 262. In an example, the salt value 316 stored in the salt storage 324 is retained and used by future processing in the master key protection processing component 306. In some examples, a device is able to be reset or otherwise operated to generate a new salt value 316 that replaces the salt value stored in the salt storage 324. The prior salt value stored in the salt storage 324 is then discarded and is not recoverable. In such a situation, encryption keys, authentication hash values, other quantities, or combinations of any of these, that were created with the prior salt value cannot be retrieved or recreated. In an example, a device is able to be reset and the salt value stored in the salt storage 324 is thus discarded when ownership of the device is transferred. In such a case, any passwords, recovery cards, as are described in further detail below, or other encryption keys are not usable and thus the device is protected from any prior owners, compromises of the master key protection that may have occurred prior to the reset, from other similar events, or combinations of any of these.

The hardware random number generator 310 also creates a random number that is to be used as a master key 312. The master key 312 in an example is a 256 bit random encryption key that is securely created by the hardware random number generator 310. The hardware random number generator 310 also creates a random number to be used as a recovery key 230. The master key 312 and the recovery key 230 in an example are randomly generated 256 bit encryption keys that are created by the hardware random number generator 310 and provides significant protection against a brute force attack to recover data encrypted by those keys.

The master key protection processing component 306, in an example, receives a user password 330. The user password 330 in an example is a password entered by a user via, for example the user interface 202. As is discussed in further detail below, the user password 330 is used to authenticate a user in order to permit various functions and also as an input in creating a master key to be used to protect, for example, the password keeper processing component 208.

The master key protection processing component 306 includes a user password validation process 304. In an example, the user password validation process 304 allows a user to provide a user password that is processed for secure storage. A user is able to set a new password at various times. As is described in further detail below, creating a new user password causes the user password validation process 304 to create an augmented user password hash based on a combination of the user provided password and other data, such as the salt value contained in the salt storage 324 and the authentication diversifier value 332. This augmented user password hash is stored in an augmented user password hash storage 320 within the replay protected memory block 262.

A user is able to enter a present password for various reasons, such as to authenticate a user submitting requests to perform master key protection management functions. When a present password is entered to authenticate a user, the user password validation process 304 validates the entered present password by creating a present augmented user password hash based on the entered present password. The present augmented user password hash is created by combining the entered present password with other data, such as the salt value stored in the salt storage 324 and the authentication diversifier value 332. This present augmented user password hash is then compared to the value stored in the augmented user password hash storage 320. In some examples, a failure to authenticate an entered present user password, such as by the present augmented user password hash not matching the value stored in the augmented user password hash storage 320, results in incrementing the value stored in the user password attempts 322. As is described in further detail below, the incremented value stored in the user password attempts 322 in some examples is compared to a threshold number of failed attempts. If the value stored in the user password attempts 322 exceeds that threshold, the master key protection processing component 306 in an example prevents further access to protected data by use of that user password.

The master key protection processing component 306 stores an encrypted value of the master key 312 into a master key encrypted storage 326. In an example, as is described in further detail below, the value stored in of the master key encrypted storage 326 is the master key 312 that is encrypted with a master encryption key. The master encryption key in an example is determined based on a hash of a combination of the values of the user password 330, the salt value stored in the salt storage 324, and the encryption diversifier value 334.

The master key protection processing component 306 in some examples also stores an encrypted value of the master key 312 into a master key encrypted for recovery storage 328. In an example, as is described in further detail below, the value stored in the master key encrypted for recovery storage 328, which is an example of a recovery encrypted master key, is the master key 312 that is encrypted with a recovery encryption key. The recovery encryption key in an example is determined based on a hash of a combination of the values of the recovery key 230, the salt value stored in the salt storage 324, and the recovery diversifier value 336.

The master key protection processing component 306 allows a user to request that the master key 312 be provided to a process, such as the password keeper processing component 208. In an example, as is described in further detail below, a user is able to request that the master key 312 be provided by submitting a request with a present user password. After authentication of the request by validation of the provided present user password, the master key protection processing component 306 provides the master key 312 to the process, such as the password keeper processing component 208.

The master key protection processing component 306 further includes recovery processing 308. The recovery processing 308 allows the user to recover data protected by the master key protection processing, such as the master key 312, by entering a recovery key 230.

As described above, a user is able to provide a recovery key 230 to an external device 250. That recovery key is also used, along with other data, to create a recovery encryption key that is used to encrypt the master key 312 for storage into the master key encrypted for recovery storage 328. The recovery key 230 is able to be retrieved from the external device 250 and provided to the recovery processing 308. The recovery processing 308 in an example uses the recovery key received from the external device 250, combines it with other data such as the salt value stored in the salt storage 324 and the recovery diversifier value 336, and decrypts the value within the master key encrypted for recovery storage 328. The master key 312 is thus able to be recovered and used for further processing. In some examples, a user is able to enter a new user password that, along with other data such as the salt stored in the salt storage 324 and the encryption diversifier value 334, is used to generate a new master encryption key to encrypt the recovered master key 312 for storage into the master key encrypted storage 326. In an example, such recovery of the master key 312 also causes the value in the user password attempts 322 to be reset.

In an example, the user password validation process 304 is able to authenticate a user based on the user providing a valid fingerprint scan. As discussed above, user authentication in some examples is able to be based on any suitable biometric data, such as a person's iris scan, retina scan, facial recognition, voice recognition, other biometric data, or combinations of any of these. In some examples, other user authentication methods are able to be used including, for example, gesture input on a touch screen, gestures captured as videos or as other suitable inputs, by other authentication techniques, or by combinations of any of these. In an example, the user interface 202 includes a fingerprint scanner 374 that allows a user to scan his or her finger and produces fingerprint scan data 376 that is provided to the user password validation process 304. In an example, the user password validation process 304 validates the received fingerprint scan data 376 by any suitable technique. In some examples, the user password validation process 304 is able to be at least partially performed within the secure processing container 206, store data such as data used to validate fingerprint scan data 376 in the secure processing container 206, or both.

In an example, a user password, such as the user password 330, is able to be encrypted and the encrypted version is stored by the user password validation process 304. In an example, the user password 330 is encrypted with a user password key 370. In an example, the user password key 370 is generated by the hardware random number generator 310 and is stored in the replay protected memory block 262. In general, the user password key 370 is able to be generated and stored by any suitable technique. In an example, an encrypted user password storage 372 is used to store the user password 330 that is encrypted by the user password key 370. Encryption of the user password 330 is able to be by any suitable technique, such as according to an AES 256 algorithm. In an example, the user password 330 is discarded after it is encrypted.

In an example, access to the master key is able to be initiated by a user's scanning his or her fingerprint with the fingerprint scanner 374, which causes the user password validation process 304 to receive the received fingerprint scan data 376. The user password validation process 304 in an example validates the received fingerprint scan data 376, such as by comparison to previously provided fingerprint scans for authorized users or by any suitable technique. If the received fingerprint scan data 376 is not successfully validated, no further processing is performed in an example.

If the received fingerprint data is successfully validated, the user password validation process 304 is granted access to a stored user password key 370 that is stored in the replay protected memory block 262. The user password validation process 304 then retrieves and decrypts the data stored in the encrypted user password storage 372. The user password validation process 304 in an example continues by processing a decrypted user password according to processing similar to that used with a user password 330 that is entered by a user, as is described in further detail below. For example, the decrypted user password that was decrypted based upon receiving fingerprint scan data is able to be used, along with other data, to create a master key encryption key that is used to decrypted the value stored in the master key encrypted storage 326. That decrypted master key is then able to be provided to an application, such as the password keeper processing component 208.

Figure 4:
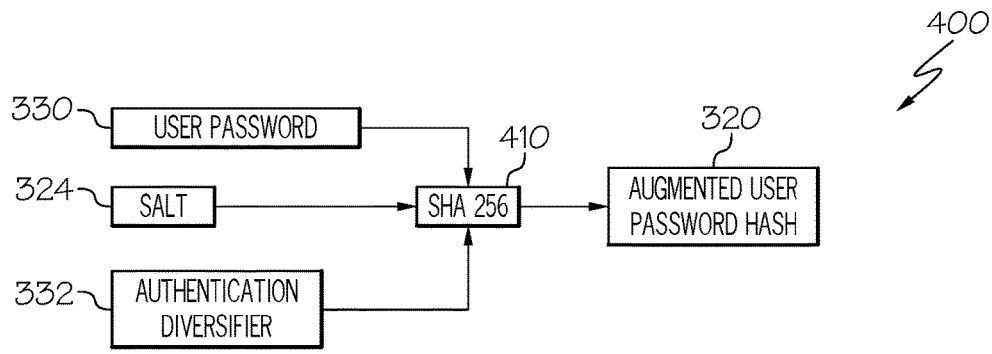
FIG. 4 illustrates a password setting data flow, according to an example.

FIG. 4 illustrates a password setting data flow/block diagram 400, according to an example. The password setting data flow/block diagram 400 in an example is performed when a user initially creates a master key for use with the password keeper processing component 208, when the user sets a new user password, at any other suitable time, or combinations of any of these. It is clear that when a new password is set, data elements encrypted with encryption keys that are based on the user password, such as the value in the master key encrypted storage 326, are re-encrypted with the new password.

The password setting data flow/block diagram 400 uses the entered user password 330, the salt value stored in the salt storage 324, and the authentication diversifier value 332. These values are combined in a suitable fashion, such as by concatenation, bitwise logical operations on the bits of each value, by any other suitable combination, or by combinations of any of these.

A hash value of the combination of the entered user password 330, the salt value stored in the salt storage 324, and the authentication diversifier value 332 in this example is determined. In the illustrated example, the hash value of this combination is determined according to the SHA256 algorithm 410. In various examples, any suitable hash function is able to be used. In yet further examples, values based on any one of the entered user password 330, the salt value stored in the salt storage 324, the authentication diversifier value 332, or any combination of two or more of these, are able to be used with or without computing a hash of that value.

The hash value produced by the SHA256 algorithm 410 in this example is stored in the augmented user password hash storage 320. The value in the augmented user password hash storage 320 is used to, for example, authenticate present user passwords submitted with requests to perform functions by the master key protection processing component 306.

Present user passwords that are subsequently entered for authentication of requests are processed in a similar manner as described above. In an example, entered present user password 330 are combined with the salt value stored in the salt storage 324, and the authentication diversifier value 332 as is described above. That combination is provided to the SHA256 algorithm 410, or another hash algorithm that was used to determine the value stored in the automated user password hash storage 320, to determine a present augmented user password hash value. That present augmented user password hash value is then compared to the value stored in the augmented user password hash storage 320 to authenticate the present user password submitted with the request.

Figure 5:
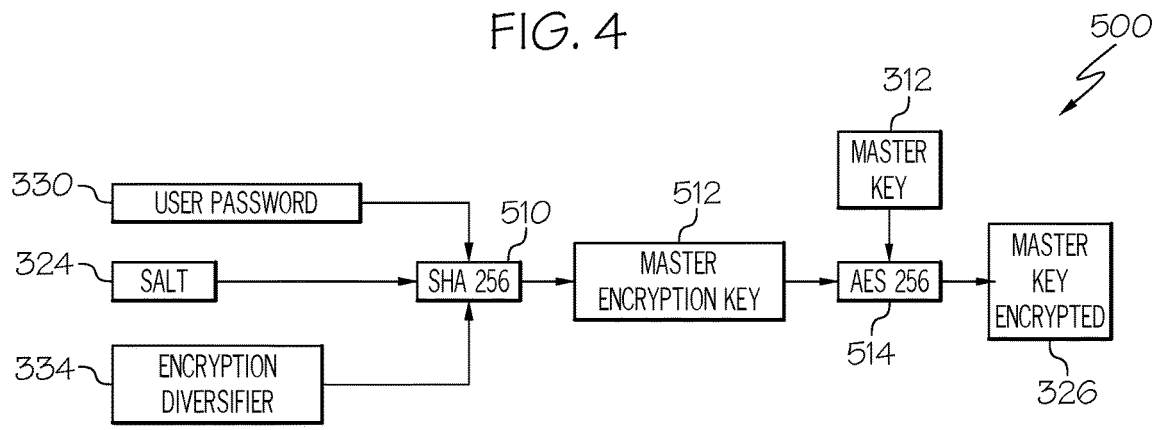
FIG. 5 illustrates a master key encryption data flow, according to an example.

FIG. 5 illustrates a master key encryption data flow/block diagram 500, according to an example. The master key encryption data flow/block diagram 500 in an example is performed when a master key is encrypted for storage into the master key encrypted storage 326. The master key encryption data flow/block diagram 500 is able to be used when, for example, a user initially creates a master key for use with the password keeper processing component 208, when the user sets a new user password, at any other suitable time, or combinations of any of these.

The master key encryption data flow/block diagram 500 uses the entered user password 330, the salt value stored in the salt storage 324, and the encryption diversifier value 334. These values are combined in a suitable fashion, such as by concatenation, bitwise logical operations on the bits of each value, by any other suitable combination, or by combinations of any of these.

A hash value of the combination of the entered user password 330, the salt value stored in the salt storage 324, and the encryption diversifier value 334 in this example is determined. In the illustrated example, the hash value of this combination is determined according to the SHA256 algorithm 510. In various examples, any suitable hash function is able to be used. In yet further examples, values based on any one of the entered user password 330, the salt value stored in the salt storage 324, the encryption diversifier value 334, or any combination of two or more of these, are able to be used with or without computing a hash of that value.

The hash value produced by the SHA256 algorithm 510 in this example is a master encryption key 512 that is used to encrypt the master key 312 for storage into the master key encrypted storage 326. The master encryption key 512 is provided, along with the master key 312, in this example to an AES256 encryption process 514. The value produced by the AES256 encryption process 514 is then stored in the master key encrypted storage 326.

Retrieval of the master key in an example is performed with a data flow similar to the master key encryption data flow/block diagram 500. In an example, a present user password 330 is received and combined with the salt value stored in the salt storage 324 and the encryption diversifier value 334. The hash value of that combination is computed by the same hash algorithm used to initially encrypt the master key 312, such as the SHA256 algorithm 510 described above. The determined hash value is used as an encryption key to decrypt the value stored in the master key encrypted storage 326. In an example, retrieval of the master key authenticates the present user password after determining the decrypting the value stored in the master key encrypted storage 326

Figure 6:
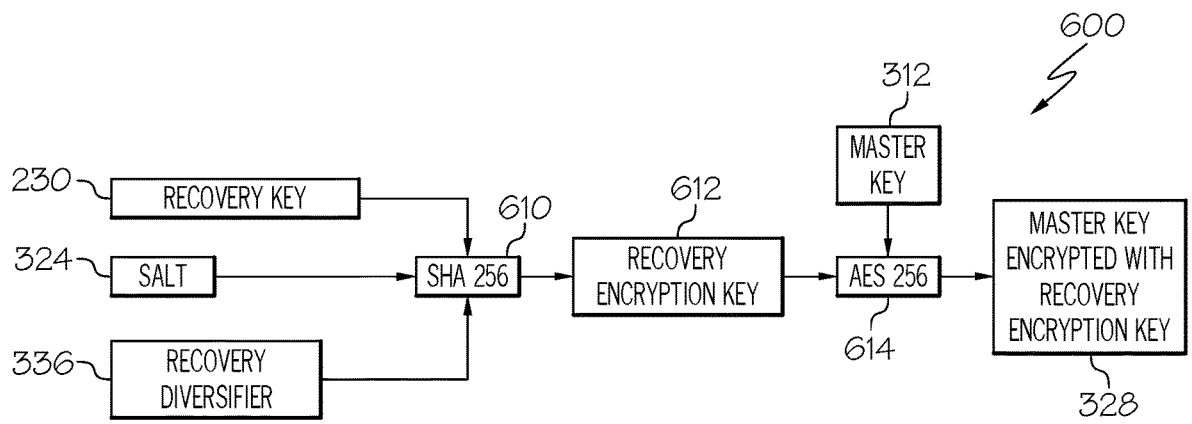
FIG. 6 illustrates a recovery key encryption data flow, according to an example.

FIG. 6 illustrates a recovery key encryption data flow/block diagram 600, according to an example. The recovery key encryption data flow/block diagram 600 in an example is performed when a recovery key is generated, such as for delivery to an external device 250 or for any other purpose. The recovery key encryption data flow/block diagram 600 produces a recovery encryption key 612 that is used to encrypt the master key 312 for storage into the master key encrypted for recovery storage 328.

The recovery key encryption data flow/block diagram 600 uses a recovery key 230 that is received by any suitable technique. In an example, the recovery key 230 is received from an external device 250. The recovery key 230 is combined with the salt value stored in the salt storage 324 and the recovery diversifier value 336. These values are combined in a suitable fashion, such as by concatenation, bitwise logical operations on the bits of each value, by any other suitable combination, or by combinations of any of these.

A hash value of the combination of the recovery key 230, the salt value stored in the salt storage 324, and the recovery diversifier value 336 in this example is determined. In the illustrated example, the hash value of this combination is determined according to the SHA256 algorithm 610. In various examples, any suitable hash function is able to be used. In yet further examples, values based on any one of the recovery key 230, the salt value stored in the salt storage 324, the recovery diversifier value 336, or any combination of two or more of these, are able to be used with or without computing a hash of that value.

The hash value produced by the SHA256 algorithm 610 in this example is a recovery encryption key 612 that is used to encrypt the master key 312 for storage into the master key encrypted for recovery storage 328. The recovery encryption key 612 is provided, along with the master key 312, in this example to an AES256 encryption process 614. The value produced by the AES256 encryption process 514 is then stored in the master key encrypted for recovery storage 328.

Retrieval of the master key in an example is performed with a data flow similar to the recovery key encryption data flow/block diagram 600. In an example, a recovery key 230 is received and combined with the salt value stored in the salt storage 324 and the recovery diversifier value 336. The hash value of that combination is computed by the same hash algorithm used to initially encrypt the master key 312, such as the SHA256 algorithm 610 described above. The determined hash value is used as an encryption key to decrypt the value stored in the master key encrypted for recovery storage 328.

Figure 7:
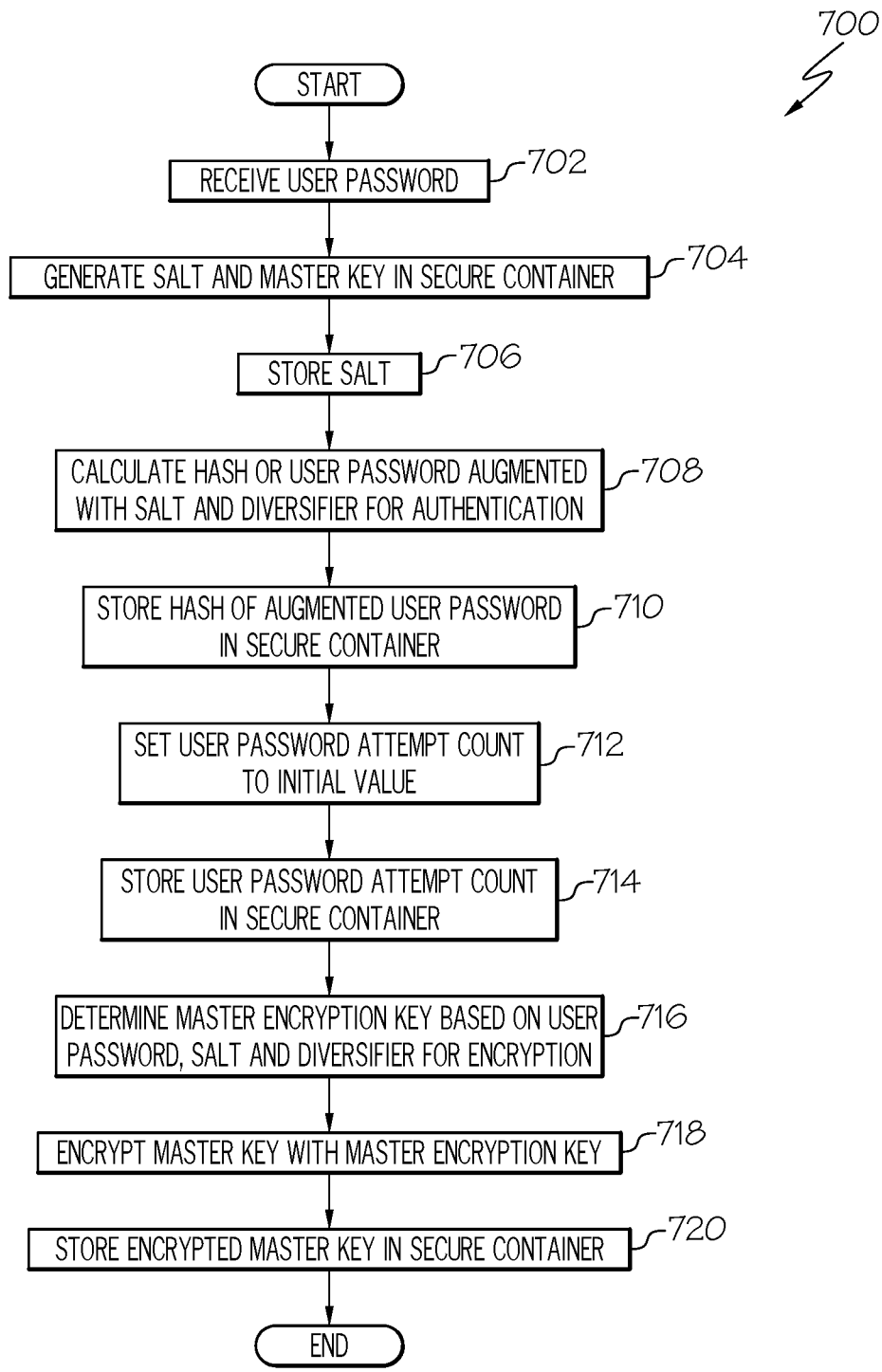
FIG. 7 illustrates a master key creation process, according to an example.

FIG. 7 illustrates a master key creation process 700, according to an example. The master key creation process 700 is an example of a process performed by the master key protection processing component 306 based on a user selecting to create a master key for an application, such as for the password keeper processing component 208. In some examples, the master key creation process 700 is at least partially performed by processing within a secure container, such as the above described secure processing container 206. In some examples, at least some data used, created, or both, by the master key creation process 700 is also stored within a secure container, such as the above described secure processing container 206.

The master key creation process 700 receives, at 702, a user password. In various examples, a user password is able to have any suitable form. For example, a user password is able to be a textual password that consists of a string of characters, a graphically based password or unlock indication such as a pattern drawn on a touch sensitive surface, any suitable input to authenticate a user, or combinations of any of these. In some examples, scan data capturing a user's fingerprint or other biometric data is able to be used in a manner similar to the use of a user password that is described below.

The master key creation process 700 generates, at 704, a salt value and a master key in a secure container. In an example, these values are generated by a hardware random number generator within a secure container. The generated salt value is stored, at 706. In an example, the generated salt value is stored in a protected storage within or controlled by the secure container, such as the replay protected memory block 262.

A hash value of the user password, that is augmented with the salt value and a diversifier for authentication is calculated, at 708. The user password is able to be augmented by any suitable technique, such as by concatenating, logical bitwise operations on the values, any other type of augmentation, or by combinations of any of these.

The hash of the augmented user password is then stored in the secure container, at 710. This hash value in an example is compared to similar hash values calculated based on subsequently received user passwords in order to authenticate the user. In an example, this hash value is stored in the augmented user password hash storage 320 in the replay protected memory block 262.

A user password attempt count is set to an initial value, at 712. The user password attempt count is used in an example to limit the number of sequential unsuccessful attempts that a user is able to make when entering a present user password.

The user password attempt count is stored, at 714, in the secure container. In an example, the user password attempt count is stored in memory within or controlled by a secure container, such as within the replay protected memory block 262.

A master encryption key is determined, at 716, based on the received user password, the salt value and a diversifier for encryption. In an example, the master encryption key is determined based on calculating a hash value of a combination of the received user password, the salt value and the diversifier for encryption.

The master key is encrypted, at 718, with the determined master encryption key. The encrypted master key is stored, at 720, in the secure container, such as within the master key encrypted storage 326. In an example, both the master key and the master encryption key are discarded and are not stored or retained, not even within the secure container. The master key creation process 700 then ends.

Figure 8:
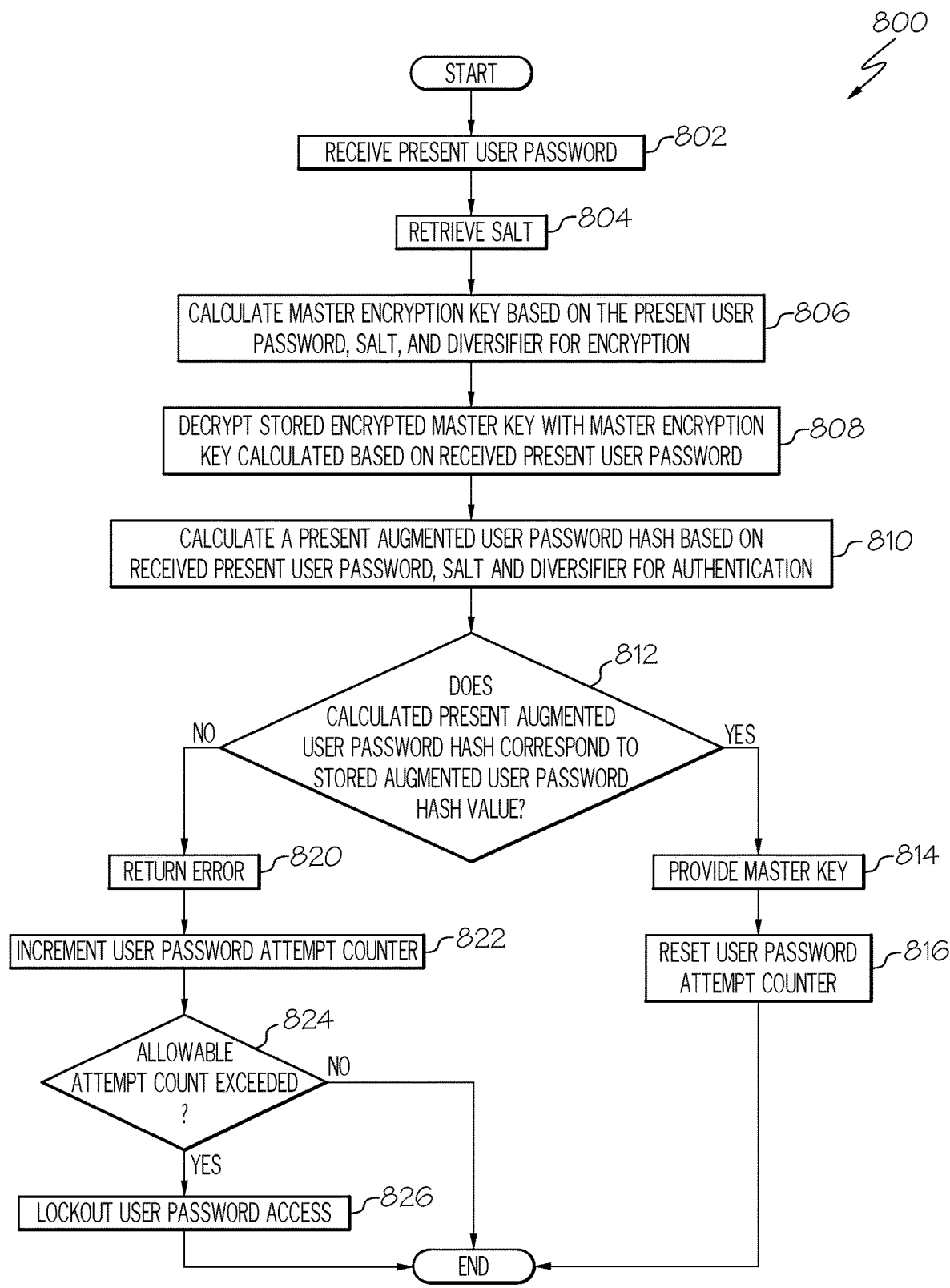
FIG. 8 illustrates a master key retrieval process, according to an example.

FIG. 8 illustrates a master key retrieval process 800, according to an example. The master key retrieval process 800 is an example of a process performed by the master key protection processing component 306 after a master key 312 has been generated and its encrypted value has been stored according to, for example, the master key creation process 700. It is pointed out that, as described above, the master key creation process does not retain either the master key 312 or the master encryption key 512. Retrieval of the master key 312 recreates the master encryption key 512 based on a presently received user password. In some examples, the master key retrieval process 800 is at least partially performed by processing within a secure container, such as the above described secure processing container 206. In some examples, at least some data used, created, or both, by the master key retrieval process 800 is also stored within a secure container, such as the above described secure processing container 206.

The master key retrieval process 800 receives, at 802, a present user password. The present user password in an example is a user password entered by a user upon initiation of the master key retrieval process 800.

A salt value is retrieved, at 804. The salt value in this example is the same salt value used in the master key creation process. This salt value is retrieved from the salt storage 324 in an example.

The master encryption key is calculated, at 806, based on the received present user password, the salt and the diversifier for encryption. The diversifier for encryption is the same diversifier used to create the master encryption key in the master key creation process 700.

The stored encrypted master key is decrypted, at 808, with the master encryption key that is calculated above based on the received present user password. In an example, the value stored in the master key encrypted storage 326 is decrypted with this recently calculated master encryption key.

A present augmented user password hash is calculated, at 810, based on the received present user password, the salt, and the diversifier for authentication. In an example, the present augmented user password hash is calculated with a data flow similar to that discussed above with regards to the password setting data flow/block diagram 400.

A determination is made, at 812, as to whether the calculated augmented user password hash value corresponds to a stored augmented user password hash value. This determination in an example compares the present augmented user password hash calculated above to the value stored in the augmented user password hash storage 320. In an example, the comparison of the present augmented user password hash to the stored augmented user password hash is performed after the above described elements of determining the master encryption key and decrypting the stored encrypted master key. Authenticating the request by validation of the present user password after performing decryption of the encrypted master key is useful in preventing timing related side channel attacks on the user's password.

If it is determined, at 812, that the calculated present augmented user password hash value corresponds to the stored augmented user password hash value, the master key obtained by decrypting the encrypted master key is provided, at 814. In an example, the plaintext master key is provided to the operating system 204, which in turns passes the master key to the password keeper processing component 208. The attempt counter is then reset, at 816. In an example, resetting the attempt counter includes resetting the value stored in the user password attempts 322. In an example, modification of values stored in the user password attempts 322 is only able to be performed by processing controlled by a secure container. The master key retrieval process 800 then ends.

If it is determined, at 812, that the calculated present augmented user password hash value does not correspond to the stored augmented user password hash value, an error is returned, at 820. Further based on this determination, the attempt counter, such as is stored in the user password attempts 322, is incremented, at 822.

After incrementing the attempt count, at 822, a determination is made in an example, at 824, as to whether the allowable attempt count has been exceeded. In an example, the allowable attempt count is set to a value such as eight (8) or twenty (20). If the allowable attempt count is determined to not be exceeded, the master key retrieval process 800 ends. If it is determined that the allowable attempt count is exceeded, user password access is locked out, at 826, and the master key retrieval process 800 ends.

Figure 9:
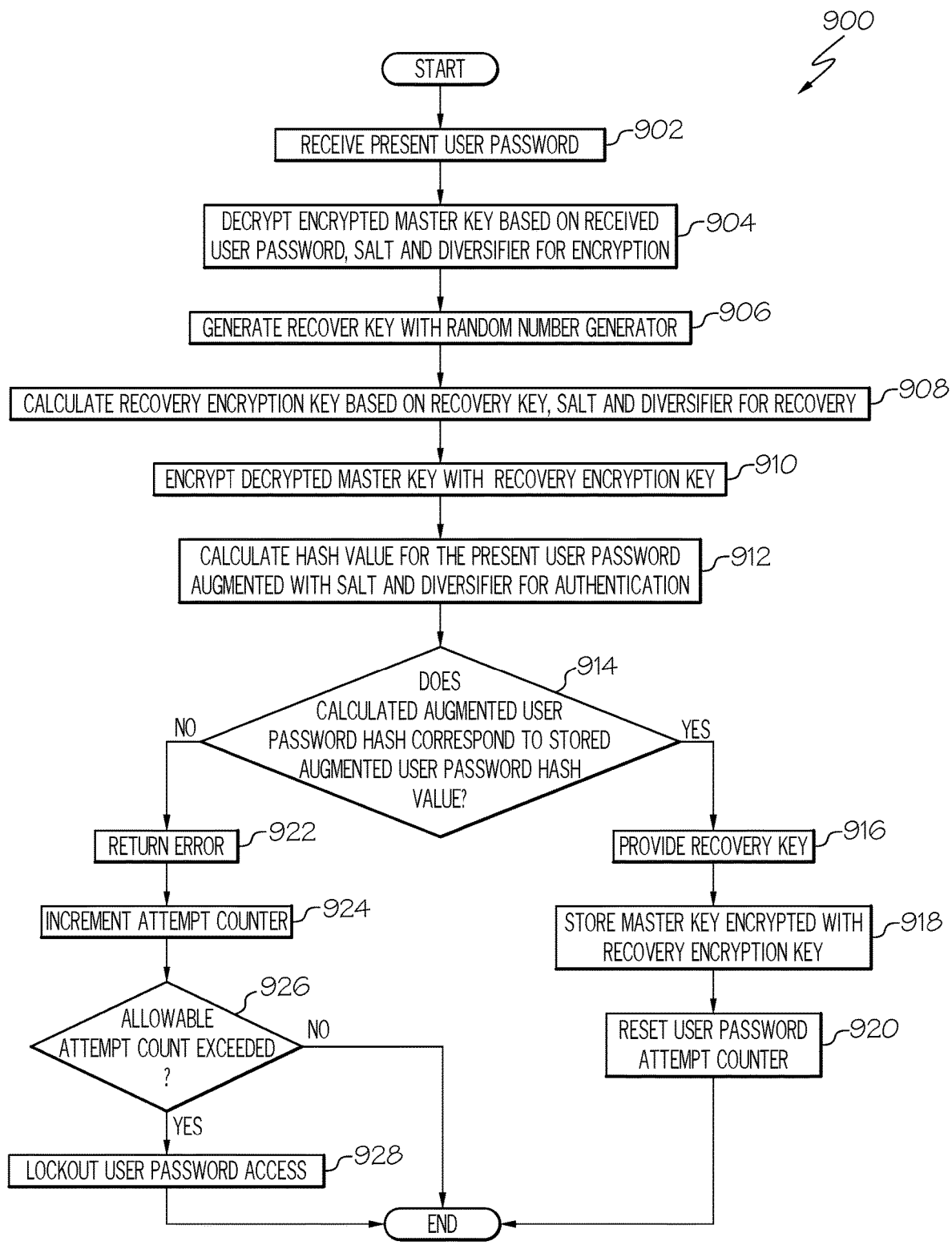
FIG. 9 illustrates a recovery key generation process, according to an example.

FIG. 9 illustrates a recovery key generation process 900, according to an example. The recovery key generation process 900 is an example of a process performed by the master key protection processing component 306 to create a recovery key that can be used to retrieve an encrypted master key. In an example, recovery keys are used to gain access to data in the password keeper processing component 208 after access by using the user password has been locked out, such as due to a user exceeding the allowable failed user password attempt count as is discussed above. In some examples, the recovery key generation process 900 is at least partially performed by processing within a secure container, such as the above described secure processing container 206. In some examples, at least some data used, created, or both, by the recovery key generation process 900 is also stored within a secure container, such as the above described secure processing container 206.

In an example, the recovery key generation process 900 is performed after the master key 312 has been generated and its encrypted value has been stored according to, for example, the master key creation process 700. It is pointed out that, as described above, the master key creation process does not retain either the master key 312 or the master encryption key 512. Retrieval of the master key 312 includes recreating the master encryption key 512 based on a presently received user password.

The recovery key generation process 900 receives, at 902, a present user password. The present user password in an example is a user password entered by a user upon initiation of the master key retrieval process 800.

The encrypted master key is decrypted, at 904, to obtain the plaintext master key. Decryption of the encrypted master key in an example is based on the received user password, a stored salt value, and a diversifier for authentication. Decryption of the encrypted master key is similar to the corresponding processing described above as part of the master key retrieval process 800.

A recovery key is generated, at 906, with a random number generator. In an example, the recovery key is generated by a hardware random number generator within a secure container.

A recovery encryption key is calculated, at 908, based on the generated recovery key, the stored salt and the diversifier for recovery. The stored salt in an example is the salt value stored in the salt storage 324. The diversifier for recovery in an example is the recovery diversifier value 336 described above. The decrypted master key is encrypted, at 910, with the recovery encryption key that is calculated above. In an example, both the recovery key and the recovery encryption key are discarded and are not stored or retained, not even within the secure container.

In an example, the present user password received above, at 902, is validated in order to authenticate the request for a recovery key. Authenticating the request by validation of the present user password after performing decryption of the encrypted master key is useful in preventing timing related side channel attacks on the user's password. The validation of the present user password is described in the following few elements depicted for the recovery key generation process 900.

A present augmented user password hash is calculated, at 912, based on the received present user password, the salt, and the diversifier for authentication. In an example, the present augmented user password hash is calculated with a data flow similar to that discussed above with regards to the password setting data flow/block diagram 400.

A determination is made, at 914, as to whether the calculated augmented user password hash value corresponds to a stored augmented user password hash value. This determination is similar to the corresponding determination described above with regards to the master key retrieval process 800.

If it is determined, at 914, that the calculated present augmented user password hash value does not correspond to the stored augmented user password hash value, an error is returned, at 922. Further based on this determination, the attempt counter, such as is stored in the user password attempts 322, is incremented, at 924. Maintaining and resetting the user password attempt counter is discussed above.

After incrementing the attempt count, at 924, a determination is made in an example, at 926, as to whether the allowable attempt count has been exceeded. If the allowable attempt count is determined to not be exceeded, the recovery key generation process 900 ends. If it is determined that the allowable attempt count is exceeded, user password access is locked out, at 928, and the recovery key generation process 900 ends.

If it is determined, at 914, that the calculated present augmented user password hash value corresponds to the stored augmented user password hash value, the recovery key is provided, at 916. In some examples, the recovery key is provided to an external device 250. In an example, providing the recovery key includes establishing a secure communications channel to a separate device, such as the external device 250, and sending the recovery key in association with a user identifier via the secure communication channel In some examples, the user identifier sent in association with the recovery key is an identifier associated with a user of the device performing the recovery key generation process 900, the separate device, or both. The master key encrypted with the recovery encryption key is also stored, at 918. In an example, the master key encrypted with the recovery encryption key is stored in the master key encrypted for recovery storage 328. The user password attempt counter is then reset, at 920. The recovery key generation process 900 then ends.

Figure 10:
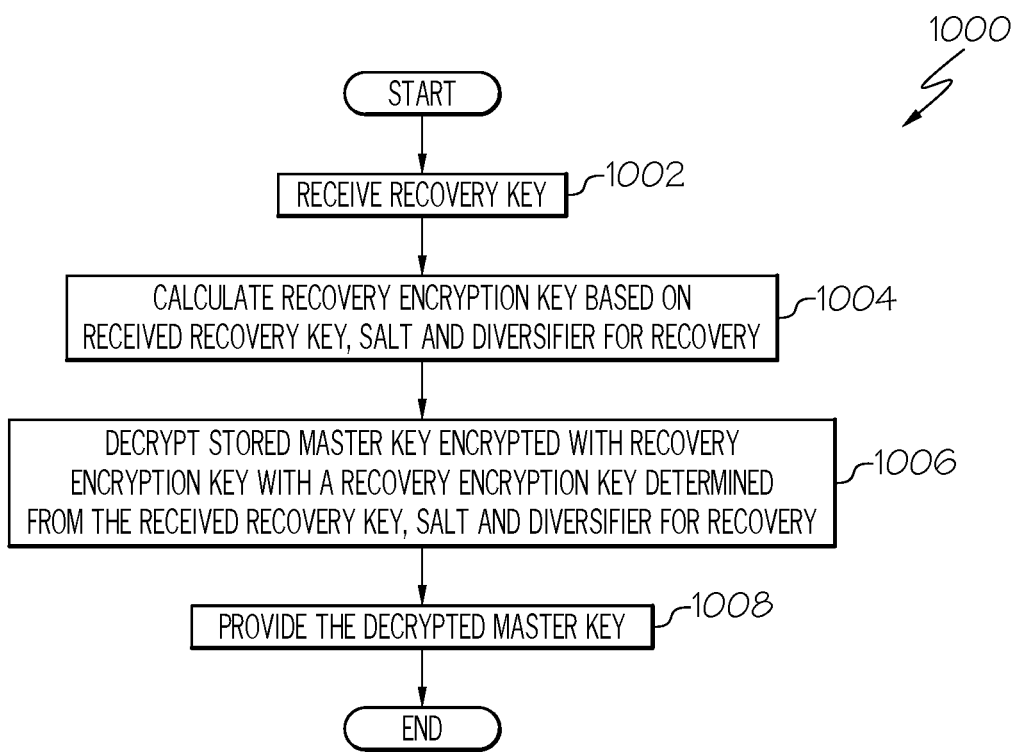
FIG. 10 illustrates a master key recovery process, according to an example.

FIG. 10 illustrates a master key recovery process 1000, according to an example. The master key recovery process 1000 is an example of a process that uses a recovery key, as is described above, to recover the master key for use with an application, such as the above described password keeper processing component 208. In some examples, the master key recovery process 1000 is at least partially performed by processing within a secure container, such as the above described secure processing container 206. In some examples, at least some data used, created, or both, by the master key recovery process 1000 is also stored within a secure container, such as the above described secure processing container 206.

The master key recovery process 1000 receives, at 1002, a recovery key. In an example, the recovery key is received from an external device 250 that received a recovery key as part of performing the above described recovery key generation process 900. In some examples, receiving the recovery key is based on, or is in response to, sending a recovery key request to a separate device, such as the external device 250, for the recovery key. In an example, the recovery key request includes a user identifier that was included when the recovery key was sent to the external device 250.

A recovery encryption key is calculated, at 1004, based on the received recovery key, a stored salt and a diversifier for recovery. The stored salt in an example is the salt value stored in the salt storage 324. The diversifier for recovery in an example is the recovery diversifier value 336 described above.

The stored master key that was encrypted with a recovery encryption key is decrypted, at 1006. In an example, the stored master key that was encrypted with a recovery encryption key was stored as part of the above described recovery key generation process 900. Decryption of the stored master key encrypted with a recovery key in an example performed with a recreated recovery encryption key determined from the received recovery key, a stored salt value, and a diversifier for recovery.

The decrypted master key is provided, at 1008. The decrypted master key is able to be provided to any suitable process. In some examples, the decrypted master key is provided to the password keeper processing component 208 to decrypt the encrypted password data it is storing. In some examples, processing is provided to allow a new user password to be provided so that the decrypted master key can be encrypted with a master encryption key based on that new password, and possibly other data. The master key recovery process 1000 then ends.

Figure 11:
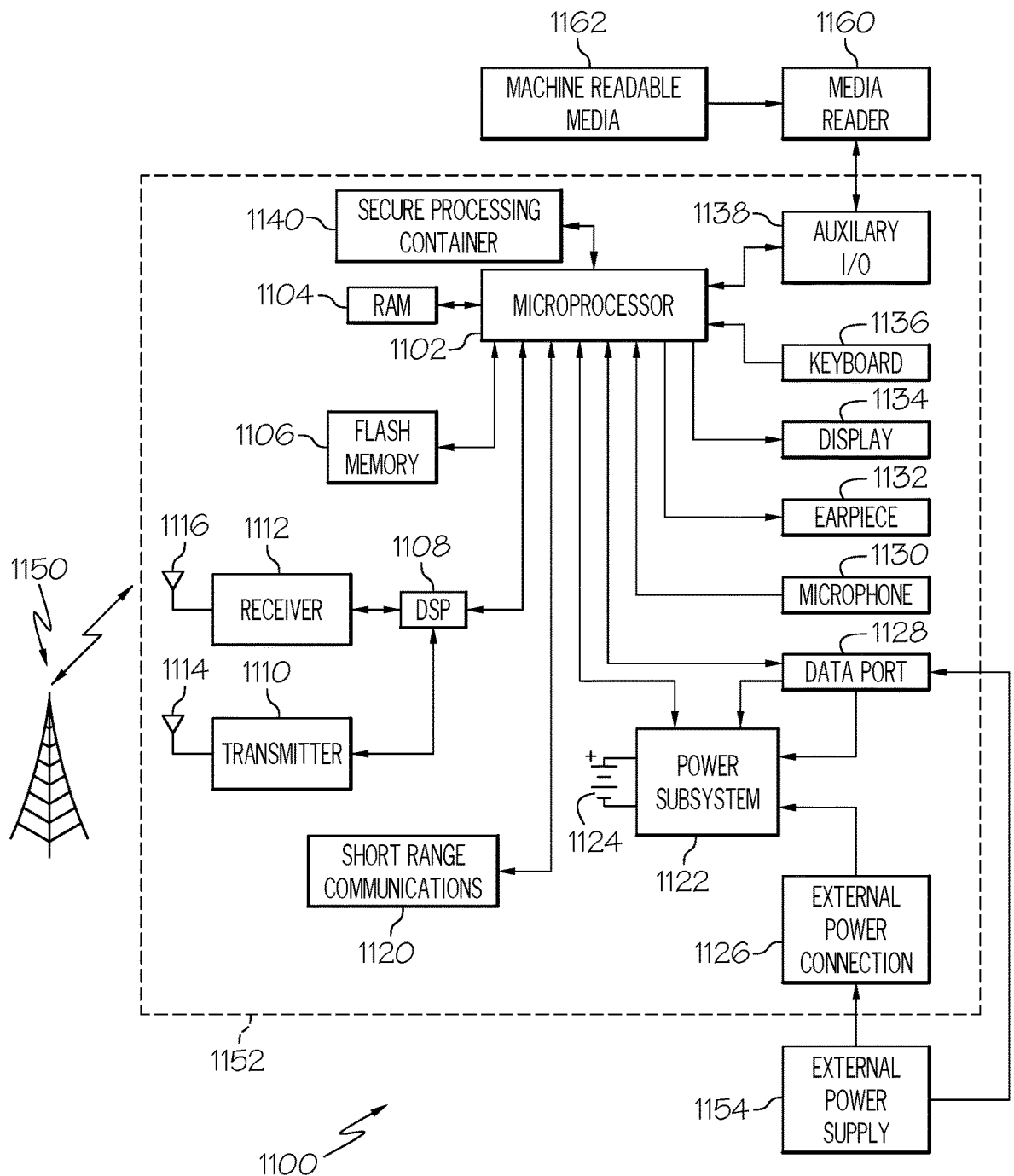
FIG. 11 is a block diagram of an electronic device and associated components in which the systems and methods disclosed herein may be implemented.

FIG. 11 is a block diagram of an electronic device and associated components 1100 in which the systems and methods disclosed herein may be implemented. The electronic device 1152 in this example comprises a wireless two-way communication device with one or more of the following: voice, text, and data communication capabilities. Such electronic devices communicate with a wireless voice, text, or data network 1150 using a suitable wireless communications protocol. Wireless voice communications may be performed using either an analog or digital wireless communication channel. Data communications allow the electronic device 1152 to communicate with other computer systems via the Internet. Examples of electronic devices that are able to incorporate the above described systems and methods include, for example, one or more of portable electronic devices, which include devices that are easily carried by a person or other carrier; or mobile devices including smartphones, tablets, phablets, wearable devices, and include devices mounted in movable systems such as vehicles of any type. In various examples, these electronic devices are able to be located in vehicles that include, but are not limited to, motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. These electronic devices are also able to include fixed devices, which include devices that are not designed to be easily or often relocated such as desktop electronic equipment; other types of electronic equipment, or combinations of these. Other examples of devices include an endpoint device, IoT (Internet of Things) device, EoT (Enterprise of Things) device, etc.

The illustrated electronic device 1152 is an example electronic device that includes two-way wireless communications functions. Such electronic devices may incorporate communication system elements such as a wireless transmitter 1110, a wireless receiver 1112, and associated components such as one or more antenna elements 1114 and 1116. A digital signal processor (DSP) 1108 performs processing to extract data from received wireless signals and to generate signals to be transmitted. The particular design of the communication system may be dependent upon the communication network and associated wireless communications protocols with which the device is intended to operate.

The electronic device 1152 includes a microprocessor 1102 that controls the overall operation of the electronic device 1152. The microprocessor 1102 interacts with the above described communications system elements and also interacts with other device systems. In various examples, the electronic device 1152 is able to include one or more of various components such as a flash memory 1106, random access memory (RAM) 1104, auxiliary input/output (I/O) device 1138, data port 1128, display 1134, keyboard 1136, earpiece 1132, audio sound reproduction system 1170, microphone 1130, a short-range communications system 1120, a power system 1122, other systems, or combinations of any of these.

The electronic device 1152 in an example includes a secure processing container 1140. In some examples, the secure processing container 1140 is a secure container that is able to exchange data with the microprocessor 1102 according to various techniques. In an example, the secure processing container 1140 is able to limit access to its operations by, for example, processing performed by the microprocessor 1102, other elements of the electronic device 1150, or combinations of any of these. In some examples, the secure processing container 1140 is able to be included in packaging with the microprocessor 1102, such as may occur with Arm® TrustZone® technology, a Trusted Execution Environment (TEE), other secure containers, or combinations of any of these. In some examples, the secure processing container 1140 is able to be packaged separately from the microprocessor 1102, such as may occur with a Trusted Platform Module (TPM), a Hardware Security Module (HSM), other separately packaged secure containers, or any combination of these. In some examples, the secure processing container 1140 performs some operations of the above described processes.

One or more power storage or supply elements, such as a battery 1124, are connected to a power system 1122 to provide power to the circuits of the electronic device 1152. The power system 1122 includes power distribution circuitry for providing power to the electronic device 1152 and also contains battery charging circuitry to manage recharging the battery 1124 (or circuitry to replenish power to another power storage element). The power system 1122 receives electrical power from external power supply 1154. The power system 1122 is able to be connected to the external power supply 1154 through a dedicated external power connector (not shown) or through power connections within the data port 1128. The power system 1122 includes a battery monitoring circuit that is operable to provide a status of one or more battery status indicators, such as remaining capacity, temperature, voltage, electrical current consumption, and the like, to various components of the electronic device 1152.

The data port 1128 is able to support data communications between the electronic device 1152 and other devices through various modes of data communications, such as high speed data transfers over an optical communications circuits. Data port 1128 is able to support communications with, for example, an external computer or other device. In some examples, the data port 1128 is able to include electrical power connections to provide externally provided electrical power to the electronic device 1152, deliver electrical power from the electronic device 1152 to other externally connected devices, or both. Data port 1128 of, for example, an electronic accessory is able to provide power to an electronic circuit, such as microprocessor 1102, and support exchanging data between the microprocessor 1102 and a remote electronic device that is connected through the data port 1128.

Data communication through data port 1128 enables a user to set preferences through the external device or through a software application and extends the capabilities of the device by enabling information or software exchange through direct connections between the electronic device 1152 and external data sources rather than via a wireless data communication network. In addition to data communication, the data port 1128 provides power to the power system 1122 to charge the battery 1124 or to supply power to the electronic circuits, such as microprocessor 1102, of the electronic device 1152.

Operating system software used by the microprocessor 1102 is stored in flash memory 1106. Examples of flash memory 1106 are able to include, for example, flash memory, magnetic based storage devices, other volatile or non-volatile data store elements, or the like. Some examples are able to use flash memory 1106 that includes a battery backed-up RAM or other non-volatile storage data elements to store operating systems, other executable programs, or both. The operating system software, device application software, or parts thereof, are able to be temporarily loaded into volatile data storage such as RAM 1104. Data received via wireless communication signals or through wired communications are also able to be stored to RAM 1104. The microprocessor 1102 in some examples are able to execute program components, such as is able to be defined in flash memory 1106 in one example, that cause the microprocessor 1102 to perform the above described processes and methods.

The microprocessor 1102, in addition to its operating system functions, is able to execute software applications on the electronic device 1152. A set of applications that control basic device operations, including at least data and optionally voice communication applications, is able to be installed on the electronic device 1152 during manufacture. In an example, programs and other data used to support the processes described above are able to be installed in the memory of the electronic device 1152. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 1152 through, for example, the wireless network 1150, an auxiliary I/O device 1138, Data port 1128, short-range communications system 1120, or any combination of these interfaces. Such applications are then able to be installed by a user in the RAM 1104 or a non-volatile store for execution by the microprocessor 1102.

In a data communication mode, a received signal such as a text message or web page download is processed by the communication system, including wireless receiver 1112 and wireless transmitter 1110, and communicated data is provided the microprocessor 1102, which is able to further process the received data. In some examples, the electronic device 1152 includes a display, output ports, or combinations of any of these. In such examples, the received data is able to be processed for output to the display 1134, or alternatively, to an auxiliary I/O device 1138 or the Data port 1128. In examples of the electronic device 1152 that include a keyboard 1136 or other similar input facilities, a user of the electronic device 1152 may also compose data items, such as e-mail messages, using the keyboard 1136, which is able to include a complete alphanumeric keyboard or a telephone-type keypad, in conjunction with the display 1134 and possibly an auxiliary I/O device 1138. Such composed items are then able to be transmitted over a communication network through the communication system.

For voice communications, overall operation of the electronic device 1152 is similar, except that received signals are generally provided to an earpiece 1132 and signals for transmission are generally produced by a microphone 1130. Alternative voice or audio I/O systems, such as a voice message recording system, may also be implemented on the electronic device 1152. Although voice or audio signal output is generally accomplished primarily through the earpiece 1132, in examples of electronic devices 1152 that include a display 1134, the display 1134 may also be used to provide an indication of the identity of a calling party, the duration of a voice call, or other voice call related information, for example.

Depending on conditions or statuses of the electronic device 1152, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 1120 provides for data communication between the electronic device 1152 and different systems or devices, which need not necessarily be similar devices. For example, the short-range communications system 1120 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of any of these.

A media reader 1160 is able to be connected to an auxiliary I/O device 1138 to allow, for example, loading computer readable program code of a computer program product into the electronic device 1152 for storage into flash memory 1106. One example of a media reader 1160 is an optical drive such as a CD/DVD drive, which may be used to store data to and read data from a computer readable medium or storage product such as computer readable storage media 1162. Examples of suitable computer readable storage media include optical storage media such as a CD or DVD, magnetic media, or any other suitable data storage device. Media reader 1160 is alternatively able to be connected to the electronic device through the Data port 1128 or computer readable program code is alternatively able to be provided to the electronic device 1152 through the wireless network 1150.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for controlling access to a master key including processing within a secure container, the method comprising:
    determining, by processing within the secure container, an encrypted master key by encrypting a master key based on an initial user password;
    discarding the master key;
    storing the encrypted master key into a protected storage;
    receiving a request for the master key, the request comprising a present user password;
    verifying, by processing within the secure container, the present user password received in the request based on comparison to the initial user password;
    incrementing, by processing within the secure container based on failure of verifying the present user password, a failed attempt counter that is maintained within the secure container; and
    locking out user password based access to the master key based on the failed attempt counter exceeding a threshold value.

2. The method of claim 1, further comprising:
    decrypting, prior to verifying the present user password, the encrypted master key to obtain a plaintext master key;
    providing the plaintext master key based on successful verification of the present user password; and
    resetting the failed attempt counter based on successful verification of the present user password.

3. The method of claim 1, wherein determining the encrypted master key by encrypting the master key is further based on an encryption diversifier value that is unique to a device performing the encrypting.

4. The method of claim 1, wherein discarding the master key is based on determining the encrypted master key.

5. The method of claim 1, further comprising:
    determining an initial recovery encryption key based on a recovery key;
    determining a recovery encrypted master key by encrypting a master key based on the initial recovery encryption key;
    storing the recovery encrypted master key;
    sending the recovery key to a separate device;
    discarding the recovery key;
    receiving a request for the master key, the request comprising a received recovery master key that has been received from the separate device;
    determining, based on receiving the request, a present recovery encryption key;
    decrypting, to obtain a plaintext master key, the recovery encrypted master key based on the present recovery encryption key received with the request; and
    providing the plaintext master key based on successful verification of the present user password.

6. The method of claim 5, wherein determining the recovery encrypted master key by encrypting the master key is further based on a recovery diversifier value that is unique to a device performing the encrypting and that is different from an encryption diversifier value.

7. The method of claim 5, further comprising;
    generating the master key with a hardware random number generator; and
    generating the recovery key with the hardware random number generator.

8. The method of claim 5, wherein sending the recovery key comprises:
    generating, based on a user identifier, the recovery key;
    establishing a secure communications channel to the separate device; and
    sending the recovery key in association with the user identifier via the secure communication channel, and
    where storing the recovery encrypted master key is based on the user identifier.

9. The method of claim 5, further comprising sending a recovery key request to the separate device for the recovery key, the recovery key request comprising a user identifier,
    where receiving the request for the master key is based on sending the recovery key request, and
    where the decrypting the recovery encrypted master key is based on the user identifier.

10. The method of claim 5, wherein discarding the recovery key is based on determining the recovery encrypted master key.

11. An encryption key protection system, comprising:
a memory;
a processor, communicatively coupled to the memory; and
a secure container, communicatively coupled to the processor and to the memory, that, when operating, is configured to:
determine, within the secure container, an encrypted master key by encrypting a master key based on an initial user password;
discard the master key;
store the encrypted master key into a protected storage;
receive a request for the master key, the request comprising a present user password;
verify, by processing within the secure container, the present user password received in the request based on comparison to the initial user password;
increment, by processing within the secure container based on a failure to verifying the present user password, a failed attempt counter that is maintained within the secure container; and
lock out user password based access to the master key based on the failed attempt counter exceeding a threshold value.

12. The encryption key protection system of claim 11, where the secure container, when operating, is further configured to:
decrypt, prior to verifying the present user password, the encrypted master key to obtain a plaintext master key;
provide the plaintext master key based on successful verification of the present user password; and
reset the failed attempt counter based on successful verification of the present user password.

13. The encryption key protection system of claim 11, wherein the secure container, when operating, is further configured to determine the encrypted master key by at least encrypting the master key is further based on an encryption diversifier value that is unique to a device performing the encrypting.

14. The encryption key protection system of claim 11, where the secure container, when operating, is further configured to further comprising:
determine an initial recovery encryption key based on a recovery key;
determine a recovery encrypted master key by encrypting a master key based on the initial recovery encryption key;
store the recovery encrypted master key;
send the recovery key to a separate device;
discard the recovery key;
receive a request for the master key, the request comprising a received recovery master key that has been received from the separate device;
determine, based on receiving the request, a present recovery encryption key;
decrypt, to obtain a plaintext master key, the recovery encrypted master key based on the present recovery encryption key received with the request; and
provide the plaintext master key based on successful verification of the present user password.

15. The encryption key protection system of claim 14, where the secure container, when operating, is further configured to determine the recovery encrypted master key by encrypting the master key further based on a recovery diversifier value that is unique to a device performing the encrypting and that is different from an encryption diversifier value.

16. The encryption key protection system of claim 14, where the secure container, when operating, is configured to:
generate the master key with a hardware random number generator; and
generate the recovery key with the hardware random number generator.

17. The encryption key protection system of claim 14, where the secure container, when operating, is further configured to send the recovery key by at least:
generating, based on a user identifier, the recovery key;
establishing a secure communications channel to the separate device; and
sending the recovery key in association with the user identifier via the secure communication channel, and
where storing the recovery encrypted master key is based on the user identifier.

18. The encryption key protection system of claim 14, where the secure container, when operating, is further configured to send a recovery key request to the separate device for the recovery key, the recovery key request comprising a user identifier,
where receipt of the request for the master key is based on sending the recovery key request, and
where decryption of the recovery encrypted master key is based on the user identifier.

19. A non-transitory computer readable storage medium having computer readable program code embodied therewith for controlling access to a master key including processing within a secure container, the computer readable program code comprising instructions for:
determining, by processing within the secure container, an encrypted master key by encrypting a master key based on an initial user password;
discarding the master key;
storing the encrypted master key into a protected storage;
receiving a request for the master key, the request comprising a present user password;
verifying, by processing within the secure container, the present user password received in the request based on comparison to the initial user password;
incrementing, by processing within the secure container based on failure of verifying the present user password, a failed attempt counter that is maintained within the secure container; and
locking out user password based access to the master key based on the failed attempt counter exceeding a threshold value.

20. The non-transitory computer readable storage medium of claim 19, the computer readable program code further comprising instructions for:
decrypting, prior to verifying the present user password, the encrypted master key to obtain a plaintext master key;
providing the plaintext master key based on successful verification of the present user password; and
resetting the failed attempt counter based on successful verification of the present user password.

\* \* \* \* \*